(No Model.)
F. LANG.
WAGON STAKE.
No. 323,512. Patented Aug. 4, 1885.
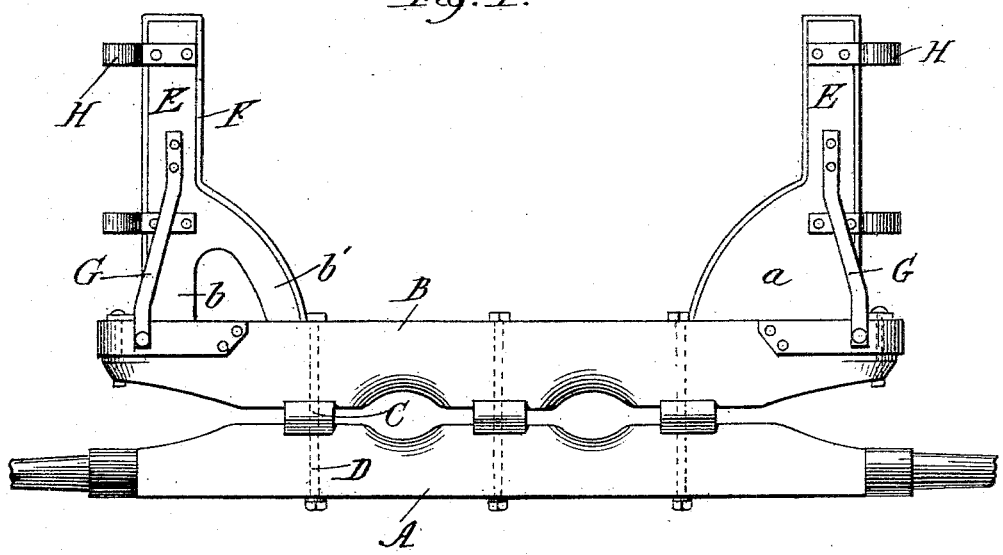
Fig. 1.
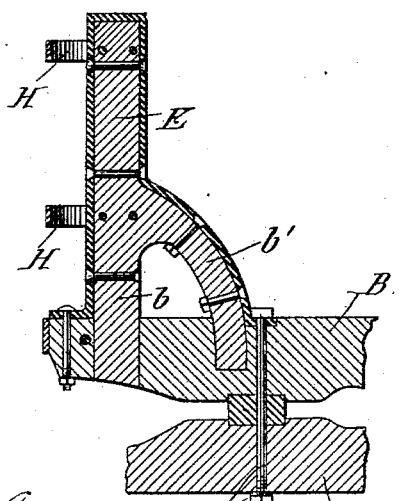
Fig. 2.
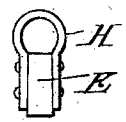
Fig. 3.
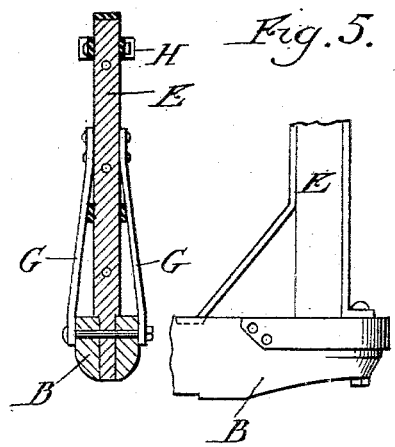
Fig. 4.
Fig. 5.
Witnesses:
Frank G. Blanchard
Louis Nolting
Inventor:
Felix Lang
By W. H. Lotz Hea
Attorneys.

UNITED STATES PATENT OFFICE.

FELIX LANG, OF CHICAGO, ILLINOIS.

WAGON-STAKE.

SPECIFICATION forming part of Letters Patent No. 323,512, dated August 4, 1885.

Application filed March 24, 1885. (No model.)

*To all whom it may concern:*

Be it known that I, FELIX LANG, a citizen of the United States of America, residing at Chicago, in the county of Cook and State of Illinois, have invented certain new and useful Improvements in Stakes for Lumber Wagons, of which the following is a specification, reference being had therein to the accompanying drawings.

My invention relates to certain improvements in stakes for lumber wagons.

The object of the invention is to so construct such stakes that the greatest strength will be obtained, and all liability of their breakage avoided.

To the accomplishment of that end the invention consists in forming such stake with a flaring base, preferably, though not necessarily, cut away to form two legs; and the invention further consists in the novel arrangement and combination of parts, as will be described and claimed.

Reference will be made to the accompanying drawings, in which Figure 1 is a front elevation of a wagon-gear with my invention applied; Figs. 2 and 4, sections taken through one stake, and Fig. 3 a top plan of the stake, and Fig. 5 a detail of a stake.

Like letters refer to like parts in each view.

A represents a wagon-axle; B, a bolster, and C the longitudinal pieces of the wagon-frame. The rear axle and bolster are secured together by bolts D, passed therethrough and held in position by suitable nuts, while at the front of the wagon the usual king-bolt connection is made. E represents my improved stakes, which are tenoned into the bolster, as clearly shown in Figs. 2 and 4. Stakes E are formed each with a flaring bottom, $a$, as shown in connection with one stake shown in Fig. 1; but if desired such bottom may be sufficiently cut away, as shown in connection with the remaining stake in that figure, to form the two legs $b$ $b'$, the latter of which is thus formed into a branch of the stake. The upper surface or edge of bottom $a$ when solid, or of leg $b'$ when the second construction is used, may either be curved, as shown, or it may be perfectly straight. The stakes are preferably covered by iron bands F, to protect them from wear, these bands being held in place by countersunk bolts, as shown. As additional supports for the stakes, I employ braces G, secured by suitable bolts to the bolster and the stakes, there being two of such braces for each stake. Secured to each stake are suitable bands, H, formed into loops to receive the posts ordinarily used on this kind of wagon. If desired, the flaring part of the stake may be done away with, thus leaving the enlarged bottom formed by the bands F only, as shown in Fig. 5.

I am aware that standards straight from top to bottom have been used and connected with inwardly-inclined braces; and I do not claim such an arrangement; but

What I claim is—

The standard E, provided with straight leg $b$ and inwardly flaring and curved leg $b'$, as set forth.

In testimony whereof I affix my signature in presence of two witnesses.

FELIX LANG.

Witnesses:
　M. J. CLAGETT,
　LOUIS NOLTING.